Oct. 16, 1934.　　　　G. J. HOLT ET AL　　　　1,977,276
LOCKING MEANS FOR TRACK HANDLING MACHINES
Filed Sept. 4, 1931　　　5 Sheets-Sheet 1
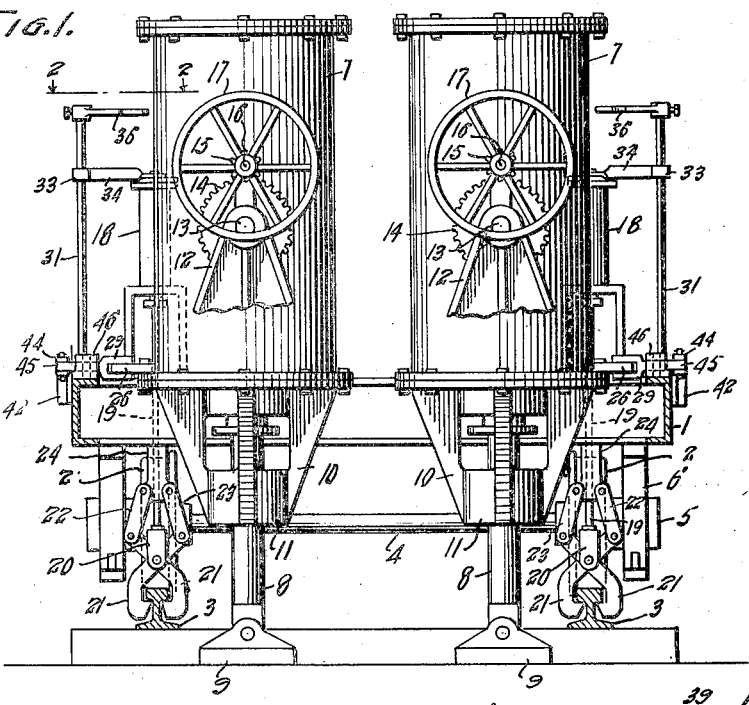
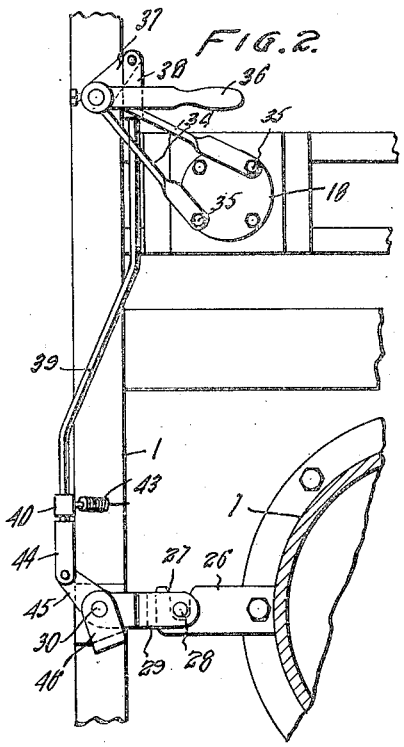
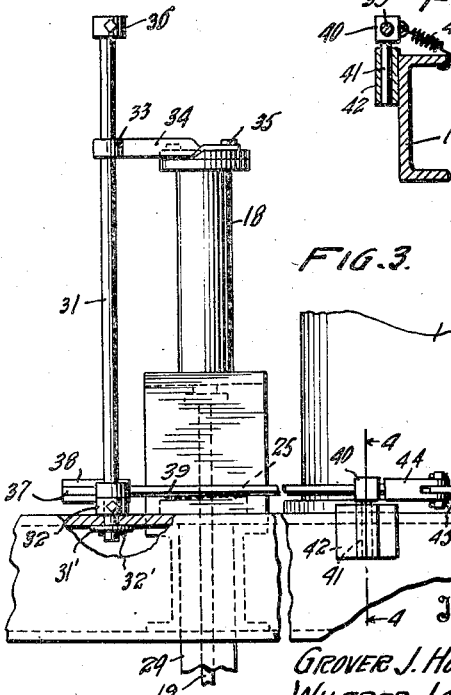
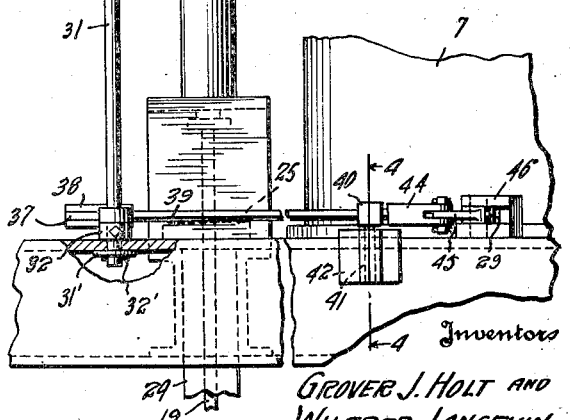
Inventors
GROVER J. HOLT AND
WILFRED LONGEVIN
By
Semmes & Semmes
Attorneys

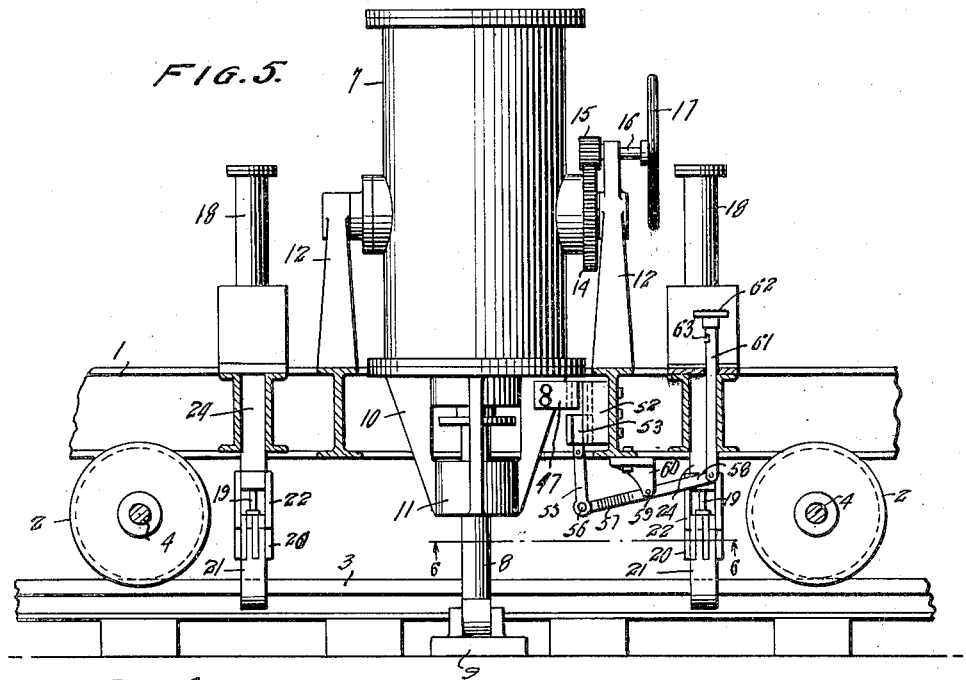

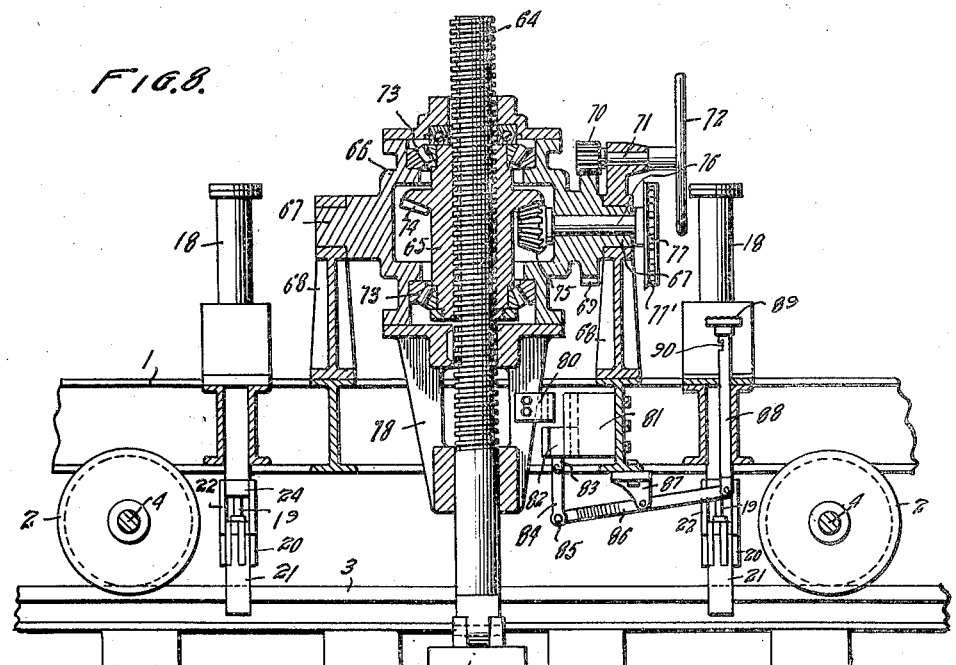
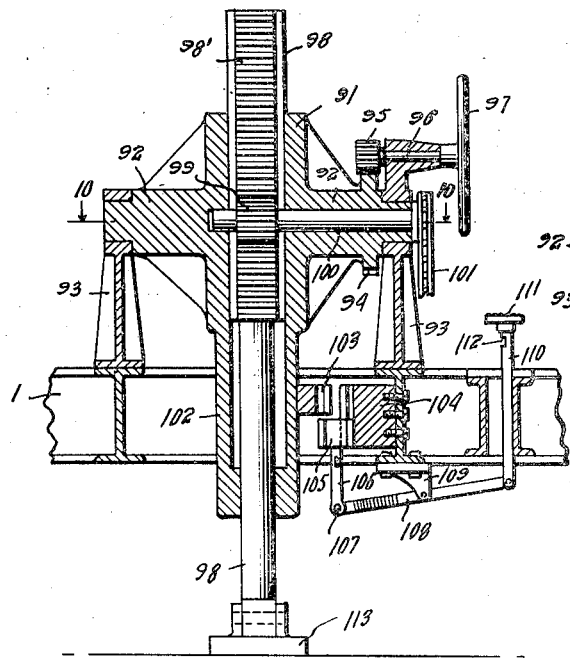
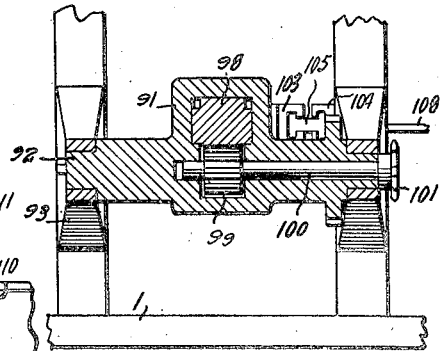

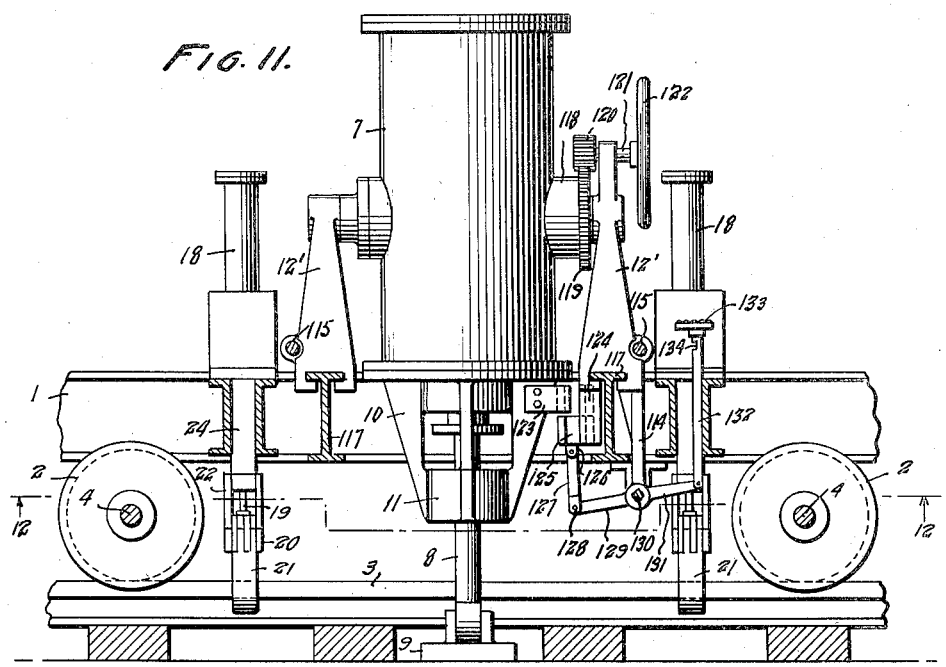
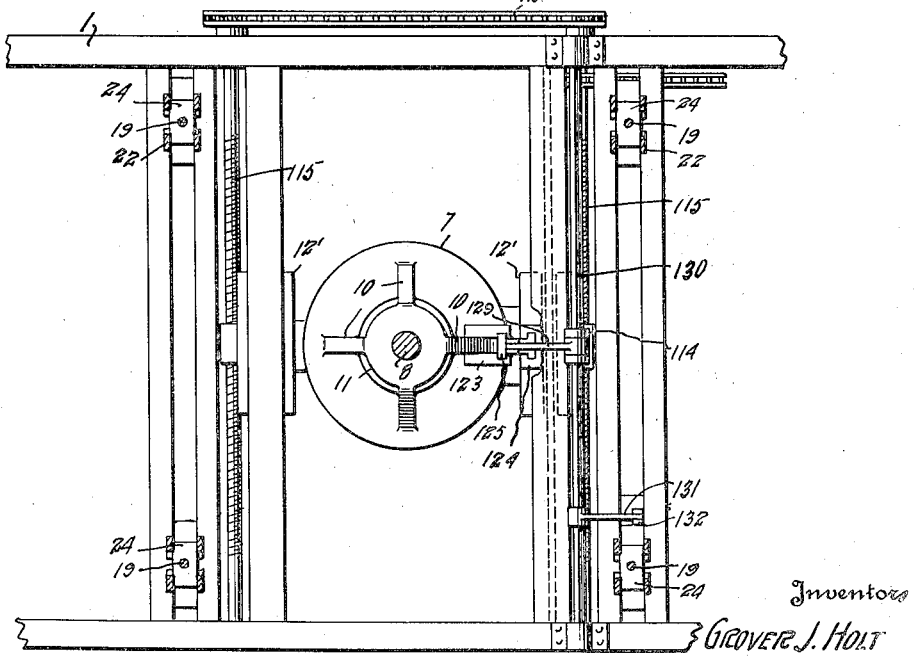

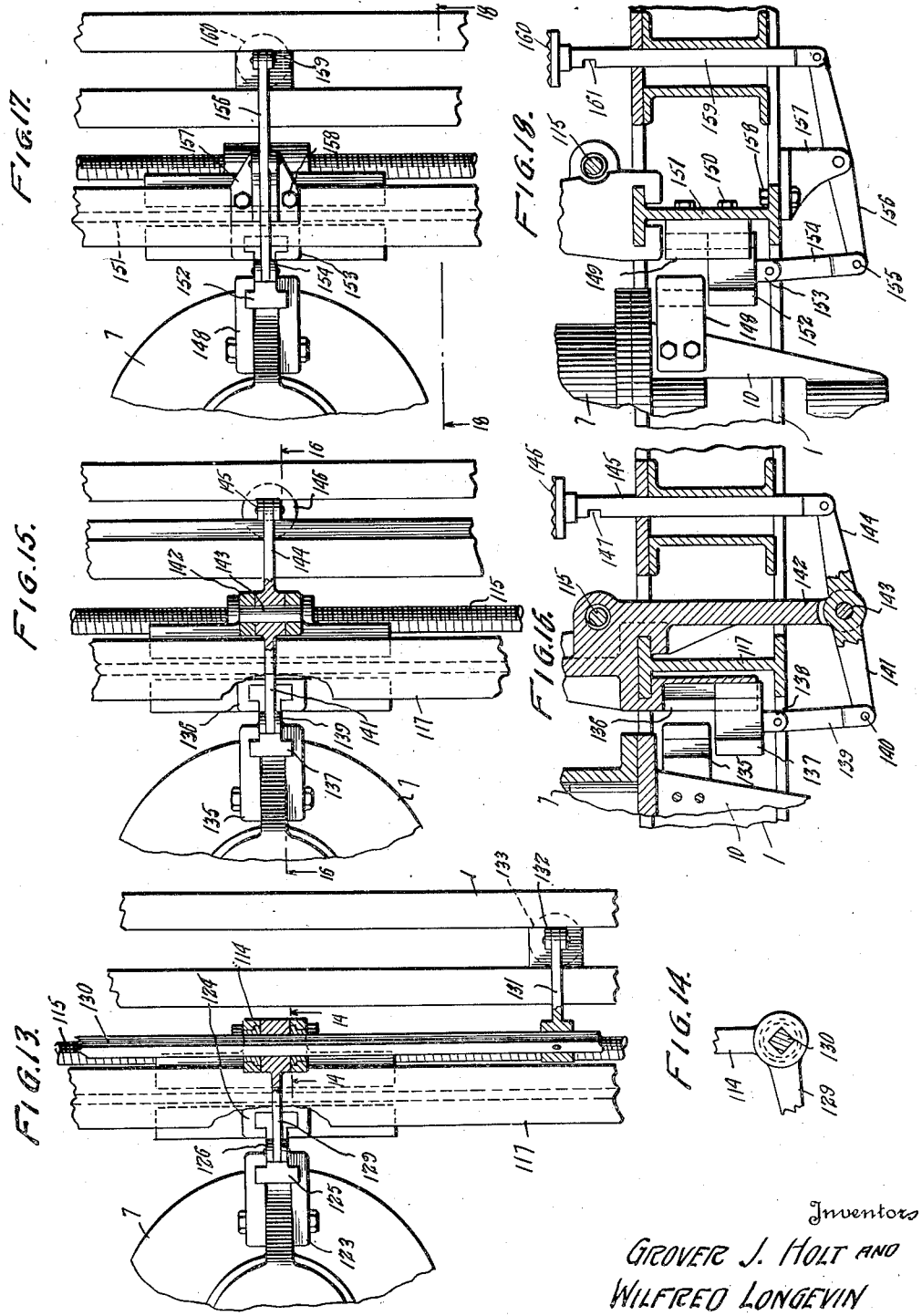

Patented Oct. 16, 1934

1,977,276

UNITED STATES PATENT OFFICE 1,977,276

LOCKING MEANS FOR TRACK HANDLING MACHINES

Grover J. Holt and Wilfred Longevin, Crosby, Minn.

Application September 4, 1931, Serial No. 561,262

14 Claims. (Cl. 104—8)

This invention relates to track handling machines and more particularly to a device for raising and/or shifting a track.

The present application is a continuation in part of application Serial No. 431,520 filed February 26, 1930.

While there are machines which are adapted for raising tracks, and other machines which are adapted for shifting tracks, there is no simple and economical machine provided for accomplishing the two functions. The economy effected by apparatus which is adapted both to raise track and maintain it in an elevated position, and to shift track, is of course obvious. The equipment heretofore used has been extremely cumbersome, which is a decided disadvantage in view of the loss of time, and the difficulty of manipulation.

The major object of our invention is the provision of a single piece of railway equipment having a plurality of functions.

Another object of our invention is to provide a track handling machine which may be optionally used for the shifting of track and as a track jack.

An equally important object of our invention is to provide an inexpensive and light device for either raising a section of track substantially vertically and maintaining it in a raised position, or for shifting the track.

Still a further object of our invention is to devise a railway track device of simple yet durable construction which is economical of manufacture and operation.

Yet another object of our invention is to provide a device for locking a thrust boom in a predetermined position.

With these and other objects in view, which may be incident to our improvements, the invention consists in the parts and combinations to be hereinafter set forth and claimed, with the understanding that the several necessary elements comprising our invention may be varied in construction, proportions and arrangement without departing from the spirit of the invention or the scope of the appended claims.

The invention consists essentially in a device, by the operation of which a section of track may be shifted from one location to another, and which is also capable of raising and maintaining the track clear of the roadbed. To this end, the invention has for one concrete embodiment the provision of a mobile carriage adapted to be clamped to a railway track. Angularly adjustable or pivotally mounted on the carriage is a thrust member which is slidable within its mounting. Means are provided whereby the thrust boom may be held in a desired pivoted position angularly disposed to the carriage.

The invention also includes means for simultaneously locking and maintaining a plurality of thrust booms in adjusted position, as well as selectively locking any of a plurality of thrust booms upon a track handling machine in predetermined positions. Our invention is not limited to hand or mechanically operated track raising and shifting mechanisms, but may be employed upon that class of machines, for instance, wherein the thrust boom is actuated by fluid pressure, by electricity, or any other motive force.

In order to make our invention more clearly understood, we have shown in the accompanying drawings, means for carrying the same into practical effect without limiting the improvements in their useful applications to the particular constructions which, for the purpose of explanation, have been made the subject of illustration.

In the drawings:

Figure 1 is a vertical cross-sectional view of one form of a double-cylinder track handling machine embodying our invention.

Figure 2 is a partial plan view of that portion of the machine shown in Figure 1 indicated by the line 2—2 showing the mechanism for locking the thrust booms in desired positions.

Figure 3 is a partial side elevation of the device disclosed in Figure 2.

Figure 4 is a vertical sectional view taken along the line 4—4 of Figure 3, and shows in detail part of the guiding and bearing member employed with the form of the invention shown in Figures 1 through 3.

Figure 5 is a partial side elevation of another form of locking mechanism associated with the car and thrust booms shown in Figure 1.

Figure 6 is a sectional view of the device shown in Figure 5, taken along the line 6—6 of Figure 5, looking in the direction of the arrows.

Figure 7 is a detailed cross sectional elevation showing the locking mechanism of Figure 5.

Figure 8 is a sectional view of a locking mechanism associated with a jack-screw type of thrust boom.

Figure 9 is a partial cross sectional view, similar to Figure 8, of a mechanism for locking a thrust boom which is of the rack and pinion type.

Figure 10 is a detailed sectional view along the line 10—10 of Figure 9, looking in the direction of the arrows.

Figure 11 is a side elevation of a single cylinder device embodying our invention.

Figure 12 is a sectional view, along the line 12—12 of Figure 11, looking in the direction of the arrows.

Figure 13 is a detailed view of the locking mechanism of Figure 12 and actuating means therefor.

Figure 14 is a detailed sectional view along the line 14—14 of Figure 13 looking in the direction of the arrows.

Figure 15 is a modified form of locking device.

Figure 16 is a sectional view along the line 16—16 of Figure 15 looking in the direction of the arrows.

Figure 17 is a view of another modified form of lock.

Figure 18 is a sectional view along the line 18—18 of Figure 17.

Throughout the drawings similar reference numerals refer to like parts in the different views. We have shown in Figures 1 through 4, our invention embodied in a track shifting machine comprising a body 1, provided with wheels 2 adapted to run upon rail tracks 3. The axles 4 of the wheels are provided with suitable journal blocks 5 at each end, which are slidably mounted within the legs of a pedestal or stirrup 6 on each side of the car so as to afford a floating connection between the wheels and the car body, and thus ease shocks that may occur during movement of the car.

For the purpose of raising or shifting the track, there is pivotally mounted upon the car, at each side thereof, a cylinder 7, which is referred to as a "lifting cylinder." Each cylinder is provided with a suitable piston (not shown) and piston rod 8, the lower end of which rod is pivotally connected to a foot or pedestal 9 adapted to contact with the ground during the operation of the machine. As may be noted, there is secured to the lower head of each cylinder, downwardly extending spiders 10 which support a guide bearing 11 through which the piston rod extends, and is adapted to slide. This bearing, it may be noted, serves as a guide and likewise a bracing or strengthening member for each piston rod 8.

For the purpose of supporting each cylinder, a pair of standards 12 are fixedly secured to the car body. The upper ends of the standards are formed with suitable bearing members adapted to rotatively receive the ends of trunnions 13 secured to the side walls of each cylinder. Mounted upon one trunnion of each cylinder is a pinion 14 adapted to mesh with a similar pinion 15 fixed to a shaft 16 journalled in the top of the standard adjacent the pinion 14. Upon the outer end of the shaft 16 there is fixedly mounted an actuating wheel 17 employed for rotating the pinion 15, and thereby tilting the cylinders to any desired angle.

Also mounted upon the car are a plurality of clamping mechanisms, at least four of such being employed. For this purpose clamp cylinders 18 are positioned upon each side of the car, each cylinder being provided with a piston (not shown) and piston rod 19. Each piston rod 19 extends through the body of the car and is provided at its end with a yoke 20 to which is pivotally secured a pair of closed rail clamps 21. The clamps 21 are in turn connected by toggle links 22 and 23, to a lifting bar 24 which also extends through the car body and surrounds the piston rod of the clamp cylinder. It may be noted the upper end of the lifting bar 24 is provided with an enlarged head 25 adapted to bear against the car body when the clamps are engaged with the rail tracks, as shown in Figure 1, and carry the load during track raising and/or shifting operations without stressing the clamp actuating mechanism.

To the end that the lifting cylinders and clamp cylinders may be actuated, there is mounted upon the car a suitable prime mover which may be coupled through means of gears, chains and sprockets, coupling members, clutches, or other devices to a fluid pressure generator. At the same time, suitable connections may be provided between the prime mover and an axle of the car so that the latter may be propelled along the track on which it runs. For the sake of simplifying the drawings, however, this mechanism has been omitted therefrom. Suitable mechanism for this purpose is disclosed in applicants' Patent No. 1,784,963, December 16, 1930, and in application Serial No. 431,520, filed February 26, 1930.

In the event that the fluid employed is compressed air, the prime mover may be coupled to an air compressor which discharges into an air reservoir, this latter being connected by means of pipe lines and two three-way valves to each end of the lifting cylinders, so that fluid under pressure may be admitted into the cylinder and exhausted therefrom, the exhaust being discharged directly into the air, or through a suitable exhaust modifying device. The outlet line from the air reservoir is also connected to a third three-way valve which is in turn connected to the two ends of each clamp cylinder so that upon its actuation air may be admitted to the clamp cylinders for the actuation of the rail clamps as desired.

Should it be found desirable, however, to employ hydraulic means for actuating the lifting and clamp cylinders, the same may be supplied by connecting the prime mover to a suitable pressure pump whose low pressure side is connected to a liquid reservoir. From the high pressure side of the pump, or its discharge end, a pipe line may be led to the two valves for actuating the lifting cylinders and also to the valve for controlling the admittance of the fluid to the clamp cylinders. With the use of hydraulic pressure, however, the exhaust from the lifting and clamping cylinders is returned to the liquid reservoir. For the purpose of providing pressure relief means, a by-pass conduit may be connected to the liquid reservoir and to the high pressure side of the pump.

While generally it may be preferable to mount such fluid pressure generating mechanism upon the track shifting machine itself, in other instances it may be desirable to place the same upon a second car of any type of railway rolling stock. It is to be understood that such an embodiment of the invention does not depart from the spirit thereof nor the scope of the appended claims.

In the operation of the machine the car is run to some spot on the track where it is necessary to shift or raise the same. At such a point, movement of the car is arrested, and through actuating the clamp valve, the piston rods of the clamps are lowered, whereupon the clamps are caused to engage the rail as disclosed in Figure 1. If it is desired to lift the track only, both the lifting cylinders are maintained in a vertical position shown in Figure 1, and their booms or piston rods are run down until the pedestals 8 are in contact with the ground. Upon continued downward movement of the piston within each lifting cylinder, the car and the track will be raised vertically. Due to the fineness of control allowed by the use of fluid pressure, upon operation of the control valves, movement of the track may be arrested at any desired elevation.

In instances where it is found desirable to lift only one side of the track, only one lifting cylinder 7 is employed, the other cylinder having its piston rod raised to its full extent so as to keep the foot thereon free from contact with the roadbed. In other instances where it is necessary to lift the entire track, but one side more than the other, it will be appreciated that this may be accomplished by cutting off the stroke of one piston and its thrust boom sooner than the other.

During shifting operations, the lifting cylinder on the side to which the track is to be shifted is employed. For example, assuming that it is desired to shift the track to the left, the left lifting cylinder 7 is tilted to the left in a counter-clockwise direction, and its boom run down to contact with the ground. On continued downward thrust of the boom it will be evident that the track and car will be raised and shifted.

After raising or shifting of the track has been effected, the clamps are released and withdrawn, while the pistons are moved upwardly within their cylinders. The thrust booms and rail clamps having been cleared, the car may be propelled to another working point on the track.

When the track handling machine is employed in raising track, it frequently occurs that the thrust booms may be eccentrically loaded, with the result that they are pivoted to some extent upon their trunnions, which causes a shifting of the track. To the end that such a condition may be prevented, we have provided a means for locking and maintaining each thrust boom in a predetermined position during raising of the track.

In the embodiment shown in Figures 1 through 4 for locking the lifting cylinders in such position, there is provided a coupling member 26 which is secured to the lower head of each cylinder by any suitable means so that it extends towards a side of the car. Provided at the outer end of each coupling member 26 is a hook or latch 27 formed by reason of a cutaway portion in the coupling member. The latch is adapted to be engaged by a vertical bolt or pin 28 carried between the bifurcated ends of a bell crank locking member 29 which is pivotally mounted upon the side of the car by means of a pivot pin 30 so that the locking member 29 may be swung in a horizontal plane. It is obvious that when the locking member is swung in a clockwise direction, as shown in Figure 2, it will engage the latch of the coupling member and secure the cylinder in an upright position.

For effecting the engagement of each locking member with its corresponding coupling member, there is mounted upon the car a suitable vertical shaft 31 (separate shafts for each locking member being shown), the lower end of which is rotatably supported, by any suitable means, in the floor of the car. Such means as those shown include an adjustable collar 32 adapted to bear against the upper surface of the floor of the car, and a plate 31' slipped over the end of the shaft extending through the floor. Such a plate may be secured in position by means of a pin 32' extending through the shaft or any other suitable means. Near its upper end the shaft 31 is supported by means of a bearing 33 carried upon arms or brackets 34 secured to the top of each clamp cylinder through bolts 35.

Obviously should different types of rail clamps be employed, upper bearings for the shafts 31 may be provided in any other manner without departing from the spirit of the invention. At its upper end, an actuating handle 36 is secured to each shaft for rotating it.

Each shaft 31 is coupled to a locking member by means of a link 37 fixed to the bottom of the shaft so as to rotate therewith. The link 37 is secured between the arms of a clevis 38 mounted upon a shifting rod 39, the opposite end of which is slidably supported in a bearing member 40.

As may be noted in Figures 3 and 4, each bearing member 40 is provided with a pin 41 adapted to be seated within a supporting bracket 42 mounted upon the frame of the car, the bearing being maintained therein by reason of a spring 43 secured to the car frame and to the bearing member 40. The end of the shifting rod 39 which extends through the bearing member 40 is also provided with a clevis, denoted by the reference numeral 44, the arms of which engage the end 45 of the bell crank locking member. As may be observed from an inspection of Figures 2 and 3, the pivot pin 30 for the bell crank locking member is supported between the arms of a U-like bracket 46, secured to the car sides in any desired manner.

From the foregoing description it will be appreciated that the actuating handle 36 and the link 37 form in effect a bell crank, so that when the operating arm 36 is moved in a counter-clockwise direction, as observed in Figure 2, the shifting rod 39 will be moved towards the shaft 31, and the bell crank locking member pivoted in a clockwise direction so that its bolt 28 will be engaged by the latch portion of the coupling member 23. Upon movement of the arm 36 in the opposite direction, it may be observed that the locking member is freed from engagement with its coupling member.

When a locking member is engaged with a coupling member, the lifting cylinder or thrust boom will be maintained in a vertical position so that during the operation of the machine for effecting the raising of the track, the cylinder will be prevented from tilting upon its trunnions. Inasmuch as we have provided a locking member and coupling member on each cylinder which are separately actuated by separate mechanism, one or both cylinders may be locked in an upright position. Of course, if desired, suitable means may be employed for connecting the two shifting rods 39 in order that they may be actuated simultaneously or separately.

In Figures 5 through 7 we have shown another form of locking mechanism applied to the track handling machine of Figure 1, wherein a coupling member 47 is secured to a spider of each lifting cylinder. As disclosed, particularly well in Figure 6, the coupling member 47 is formed of the two halves 48 and 49, having inturned ends 50 so as to provide a T-like channel 51 within the halves when they are secured to the spider of the cylinder.

Directly opposite each coupling member 47, a guide member 52 provided with a T-shaped recess 52' is secured to the frame of the car so that the recess is in a vertical plane. A locking member or bolt 53 of an I-like cross-section, has one of its flanges slidably mounted within the T-shaped recess of the guide block 52. It will be evident from this construction that when the locking member 53 is moved vertically, its free flange and web will engage the T-like recess between the halves of the coupling member 47 and the thrust boom will be locked in a vertical position.

For effecting vertical movement of the locking members 53, there being one for each cylinder, the lower ends thereof are provided with arms 54 each of which is pivotally connected to a link 55, the opposite end of which is secured to a common shaft 56. To the shaft 56 there is secured the bifurcated arms 57 of a shifting fork 58 which is pivotally supported at 59 upon a bracket 60 secured to the car frame. The opposite end of the shifting fork 58 is pivotally connected to an operating link 61 extending through the car frame and slidably mounted therein, its upper end being provided with an enlarged head 62, below which a cutaway portion or a notch 63 is provided.

In this disclosure it is evident that when the head 62 is pushed downwardly, the fork 58 will be pivoted and swing in a clockwise direction, (see Figure 7) with the result that the link 55 attached to each of the locking members or bolts 53 will be moved upwardly so as to cause the latter to be engaged with the coupling members. As indicated in Figure 7, by the use of the notch portion 63, in the operating link, the latter may be secured in its lowermost position by causing the notch to engage with the edge of the car floor or with any suitable device.

By means such as those just disclosed in Figures 5 through 7, it may be observed that an effective lock for maintaining a plurality of thrust booms in vertical position during a raising operation or for any other purpose has been provided. Likewise it will be noted that means for effecting simultaneous locking of the thrust booms is disclosed.

In Figures 8 and 9, we have disclosed other forms of track shifting machine upon which the locking means for securing the thrust booms, shown in Figures 5 through 7, are associated. There is disclosed in Figure 8 a thrust boom 64 of the jack screw type. The boom 64 is engaged by a threaded nut 65 rotatively mounted within a casing or sleeve 66 supported upon trunnions 67 which are mounted upon pedestals 68. One of the trunnions 67 is provided with a suitable gear 69 adapted to mesh with a pinion 70 mounted upon a shaft 71 to the outer end of which is secured an operating wheel 72 so that the sleeve and the thrust boom may be angularly positioned if desired.

Threaded sleeve 65 is supported internally of the sleeve 66 through the means of suitable radial and thrust bearings 73 and has formed thereon gear teeth 74 adapted to mesh with a gear 75 secured to the other end of a shaft 76 which extends through one of the trunnions. As may be noted, the shaft 76 is freely rotatable within the trunnion so that upon rotation of the sleeve-like casing to angularly position the thrust boom, rotation of the shaft will not be caused.

Upon the outer end of the shaft 76 there is fixed a suitable gear 77 engaged by the sprocket chain 77' which may be connected through any suitable means to a prime mover. With the use of two thrust booms, the gears 77 may be driven simultaneously or separately through any well known means for connecting them to a common drive.

As may be noted in Figure 8, the sleeve 65 has secured thereto a guide member or spider 78 which forms a continuation thereof and through which the jack screw 64 is freely movable. Also it may be observed that the end of each jack screw is provided with a pivotally mounted foot or pedestal 79.

As in the case of the construction shown in Figures 5 through 7, the spider 78 has secured thereto a coupling member 80 of similar construction to the coupling member 47, while mounted adjacent thereto is a guide block 81 which engages one flange of a bolt or locking member 82, also similar to the locking member 53. Movement of the locking member 82 is obtained by the use of the arm 83 and link 84 connected thereto and to a shaft 85 which is raised and lowered by means of the fork member 86, pivotally mounted upon a bracket 87. The opposite end of the fork member, as in the construction of Figure 5, is pivotally secured to an operating lever or link 88 provided with a head 89 and notched portion 90 adapted to engage the floor of the car when moved downwardly so as to secure the locking members in place. In its operation, the locking devices shown in Figure 8 are similar to that of Figure 5, there being two in number, one for each boom. For the sake of simplicity, however, only one thrust boom has been disclosed.

Still another form of the invention is shown in Figures 9 and 10 where a sleeve 91 is provided with trunnions 92 rotatively supported upon standards 93. The sleeve 91 may be angularly positioned by means of a gear 94 secured upon one of the trunnions which is rotated by a pinion 95 on a shaft 96 carried by one of the standards. For the purpose of rotating the shaft, an operating wheel 97 is provided.

Within the sleeve 91 there is slidably mounted a thrust boom 98 having a pivotally mounted foot or pedestal 113. The boom 98 is of such size as to have a sliding engagement or fit within the sleeve. Upon one side of the thrust boom, rack teeth 98' are provided which mesh with a pinion 99 fixed to a shaft 100 rotatively mounted within the trunnions. At its outer end the shaft 100 is provided with a suitable gear over which a sprocket chain 101 may be placed for the purpose of actuating the shaft and hence the thrust boom.

As previously mentioned in connection with Figure 8, the sprocket chain 101 may be connected to a power source through any suitable means so as to raise and lower the thrust boom and hence raise and/or shift the track. In the event two thrust booms are employed, they may be actuated either together or separately through suitable couplings connecting them to a common drive shaft.

As in the case of the other forms of inventions disclosed, the sleeve 91 is continued downwardly so as to form a guide member or portion 102 within which the thrust boom is freely slidable. Upon this member there is fixedly secured a coupling member 102, in this instance it being formed of one-piece construction, as is evidenced in Figure 10.

By the use of a guide block 104, an I-like locking member 105 may be moved into engagement with the coupling member through the means of the arm 106, secured to the coupling member and to the shaft 107. The shaft 107 is again engaged by a forked shifting bar 108 pivotally mounted upon a bracket 109, the other end being connected to an operating lever 110, provided with a head 111 and notched portion 112 for securing the lever at its lowermost position. Operation of the securing means shown in Figures 9 and 10 is similar to that previously described in connection with Figures 5 through 8.

It will be obvious that by connecting each of the arms 55, 84 and 106 to a separate member, instead of the forked shifting member shown, the locking mechanism shown in Figures 5 through 10 may be actuated separately instead of simultaneously for each thrust boom.

While in Figures 8 through 10 we have shown a mechanically operated track raising and shifting machine having the locking means of Figures 5 through 7 associated therewith, it is to be understood that instead of this device we may employ the mechanism first described, namely that of forming the disclosure of Figures 1 through 4.

Although in Figure 8 we have shown fluid pressure actuated clamp mechanism for securing the car to the track, it will be understood that our invention is not limited to this form, but includes the use of the construction shown with any type of clamp mechanism. Also while the means for locking the booms in a predetermined position have been shown as mechanically actuated, it will be readily appreciated that they may be connected to fluid pressure actuated devices for causing their movement. For example, either the operating shaft of Figures 1 through 4, or the operating lever of Figures 5 through 10 may be moved by suitable connections with the piston rod of a piston associated with a cylinder. Where a fluid pressure actuated track handling machine is employed, this latter expedient may be desirable.

In Figures 11 through 13, we have shown a form of locking mechanism applied to a track handling machine having one lift cylinder adapted to be moved transversely of the carriage. Such a type of machine is disclosed in applicants' Patent No. 1,784,963, issued December 16, 1930. As shown in Figure 11, the cylinder is pivotally supported by standards 12' having integral extensions 114. The standards are adapted to be moved transversely of the carriage on I-beams 117 by means of screw shafts 115 actuated by a chain 116 driven by a suitable prime mover, not shown. The upper ends of the standards are formed with suitable bearing members adapted to rotatively receive the ends of trunnions 118 secured to the side wall of the cylinder.

A pinion 119 is mounted on one trunnion and is adapted to mesh with a smaller pinion 120 fixed to a shaft 121 journalled in the top of the standard adjacent the pinion 120. A wheel 122 is mounted on the other end of the shaft 121 and rotates pinion 120, thereby tilting the cylinder to any desired angle.

As in the case of the construction shown in Figures 5 through 7, a coupling member 123 is secured to the spider and a guide block 124 which engages one flange of a bolt or locking member 125 is mounted adjacent thereto. The locking member 125 is moved by an arm 126 and a link 127 connected thereto and also to a shaft 128 which is raised and lowered by means of an arm member 129 pivotally mounted upon the extension 114 by means of a square rocker shaft 130.

Connected to the shaft 130 to rock the same is a rocker arm 131 pivotally secured to an operating lever or link 132 provided with a head 133 and a notched portion 134 adapted to engage the floor of the car when moved downwardly to secure the locking members in place. In operation, the locking devices shown in Figures 11 through 13 are similar to that of Figures 5 and 8. When the cylinder is in the desired position, the head 133 is depressed which rocks shaft 131 thereby actuating the locking mechanism and holding it in a fixed position by engagement between the notch 134 and the floor of the car.

Another modified form of locking mechanism is shown in Figures 15 and 16. In this modification, the rocker arm and actuating means therefor are moved with the cylinder and locking mechanism transversely of the car. A coupling member 135 is fixedly secured to the spiders which form a guide member within which the thrust boom is freely slidable. A guide block 136 is mounted adjacent the coupling member and engages one flange of a locking member 137. Movement of the locking member is accomplished through an arm 138, a link 139 connected thereto and to a shaft 140 which is raised and lowered by means of a member 141 pivotally mounted upon an extension 142 from the trunnions supporting the cylinder by means of a shaft 143. A rocker arm 144 is likewise pivotally mounted on the shaft 143 and is adapted to move the member 141. The rocker arm 144 is pivotally connected to an operating lever 145 having a head 146 and a notched portion 147 for engagement with the floor of the car when the head is depressed. In operation, the locking mechanism is the same as shown in Figures 11 through 13, the actuating mechanism being adapted to move with the locking mechanism.

There is shown in Figures 17 and 18 a still further modified form in which the cylinder is adapted to be locked when in the middle of the car. As shown, a coupling member 148 is secured to the spider extending downwardly from the cylinder. Mounted adjacent thereto is a guide block 149. As shown the guide block 149 is secured to the I-beam 151, which forms a track for the trunnion to travel on, by means of units, or suitable securing means 150. A locking member 152 having one of its flanges slidably mounted within the guide block 149 is adapted to move vertically therein. The locking member is actuated by an arm 153, a link 154 connected thereto and to a shaft 155 which is raised and lowered by means of a member 156 pivotally mounted at its middle upon an extension plate 157 secured to the I-member 151 by means of a nut and bolt 158. The extension of the member 156 is pivotally connected to an operating lever 159 having a head 160 and a notched portion 161 for engaging the floor of the car when depressed. It will be evident that the actuating mechanism for the locking device is stationary and when the cylinder is in the middle, it may be locked as before described.

While we have shown one type of locking mechanism associated with the single cylinder track handling machine, it is to be clearly understood that the locking mechanism shown in Figures 1 through 5 may be used.

It will be appreciated from the foregoing disclosure that we have provided a novel means for locking and maintaining a tiltable thrust boom or booms of a track handling machine in a predetermined position. Not only is the device which we have shown of use during a track raising operation, but it has the decided advantage of preventing oscillation of the thrust boom during movement of the car from one working position to another. The invention which forms the subject matter of this application, it may be noted, is not limited to any particular type of track handling machine, but may be used to advantage upon machines actuated manually mechanically, or through fluid pressure means. Such a mechanism as we have provided for maintaining the thrust boom or booms in a predetermined position besides being of simple construction and simple operation, may be readily associated with existing forms of track handling machines, now in use, with but slight structural changes or additions thereto.

While we have shown and described the preferred embodiment of our invention, we wish it to be understood that we do not confine ourselves to the precise details of construction herein set forth, by way of illustration, as it is apparent that many changes and variations may be made therein by those skilled in the art, without departing from the spirit of the invention, or exceeding the scope of the appended claims.

We claim:

1. In a track handling machine having a plurality of thrust booms, each of said booms being slidably mounted within a tiltable sleeve, a coupling member on each sleeve, a locking member for each coupling member, and means on said machine for moving either of said locking members into and out of cooperation with its corresponding coupling member.

2. In a track handling machine having a plurality of thrust booms, each of said booms being slidably mounted within a tiltable sleeve, a coupling member on each sleeve, a locking member therefor, and means on said machine for simultaneously effecting the cooperation of said locking members with their corresponding coupling members so as to maintain said sleeves and their thrust booms in a predetermined position.

3. In a track handling machine having a plurality of tiltable thrust booms mounted thereon, each of said thrust booms operated from a common source of power, means mounted upon said machine for simultaneously locking and maintaining each of said thrust booms in a predetermined position.

4. In a track handling machine having a thrust boom slidable within a sleeve tiltably mounted upon the machine, means for locking and maintaining said sleeve and thrust boom in a predetermined position comprising a coupling member secured to said sleeve, said coupling member being provided with a cutout portion forming a latch, a bell crank like locking member pivoted upon said machine, one end of said locking member being bifurcated and provided with a pin between the arms thereof, and means connected to the other end of said locking member for moving the arms and pin thereof into and out of engagement with the coupling member.

5. In a track handling machine having a thrust boom slidable within a sleeve tiltably mounted upon the machine, means for locking and maintaining said sleeve and thrust boom in a predetermined position comprising a coupling member secured to said sleeve, said coupling member being provided with a cutout portion forming a latch, a bell crank like locking member pivoted upon said machine, one end of said locking member being bifurcated and provided with a pin between the arms thereof, a slidably mounted rod connected through a clevis to the other end of said locking member, a second clevis on the opposite end of said rod, a link connected to said second clevis and fixed to a shaft rotatively mounted on said machine, and an operating lever secured to said shaft for causing its rotation.

6. A track handling machine comprising a car adapted to run upon the track to be shifted, means mounted on the car for clamping the same to the track, a lifting cylinder with fluid pressure actuated piston and piston rod associated therewith, said lifting cylinder being supported upon trunnions rotatably mounted upon a pair of standards upon the car, a coupling member secured to said cylinder, said coupling member being provided with a cutout portion forming a latch, a bell crank like locking member pivotally mounted upon said car, one end of said locking member being bifurcated and provided with a pin between the arms thereof, and means connected to the other end of said locking member and associated with said car for moving the arms and pin of the locking member into and out of engagement with the coupling member.

7. In a track shifting machine having a thrust boom slidable within a sleeve, the latter mounted for angular adjustment upon said machine, a coupling member secured to said sleeve, a guide block provided with a T-shaped recess in one face thereof mounted upon said car adjacent said coupling member, a locking member having an I-like cross section adapted to cooperate with said coupling member, one flange of said locking member being slidably mounted within the T-shaped recess of said bearing block, and means connected to said locking member for moving it into and out of cooperation with said coupling member.

8. In a track handling machine having a plurality of thrust booms, each of said booms being slidable within a sleeve pivotally mounted upon said machine, means for simultaneously locking and maintaining each of said sleeves and their thrust booms in a predetermined position, said means comprising a coupling member secured to each of said sleeves, each of said coupling members being provided with a recess adapted to engage one flange of an I-shaped locking member, each of said locking members being slidably mounted within a guideway formed in a guide block secured to said machine, a link for each locking member having one of its ends connected to the locking member and its other end to a common shaft, and means connected to said shaft for causing the movement of said links so as to effect the engagement of said locking members with said coupling members.

9. In combination with a track shifting machine comprising a car adapted to run upon rail tracks, means on the car for clamping the same to the track, a track raising and shifting mechanism including a sleeve pivotally mounted upon a pair of pedestals upon the car, a nut rotatably mounted within said sleeve and internally threaded for engagement with external threads upon a thrust boom, a coupling member secured to said sleeve, a locking member therefor, and means connected to said locking member for moving the same into and out of cooperation with said coupling member.

10. A track handling machine having a plurality of externally threaded thrust booms, each of said thrust booms being mounted within an internally threaded nut rotatably mounted within a sleeve, said sleeve being pivotally supported upon a pair of standards upon the machine, a spider formed upon each of said sleeves, a locking member secured to an arm of each of said spiders, each of said coupling members being provided with a recess adapted to receive a locking member slidably mounted within a guide block, and means connected to each of said locking members for simultaneously moving them into and out of cooperation with their corresponding coupling members.

11. In a track handling machine having a thrust boom provided with rack teeth upon one of its faces, said thrust boom being slidably mounted within a sleeve pivotally mounted upon a pair of pedestals on said machine, a driven shaft extending through said sleeve and provided with a pinion for engagement with said rack teeth, a coupling mounted upon said sleeve, a locking member therefor, and means connected to said locking member for moving it into and out of cooperation with the coupling member.

12. In a track handling machine having a thrust boom slidably mounted within a tiltable sleeve, a coupling member on said sleeve, a locking member therefor connected to a rocker shaft and means associated with said rocker shaft for actuating same so as to effect engagement between the coupling member and locking member to maintain the sleeve and thrust boom in a predetermined position.

13. In a track handling machine having a thrust boom slidably mounted within a tiltable sleeve, a coupling member on said sleeve, a locking member therefor, and means associated with said locking member and adapted to be moved therewith so as to effect engagement between the coupling member and locking member to maintain the sleeve in a predetermined position.

14. In a track handling machine having a thrust boom slidably mounted within a tiltable sleeve, a coupling member on said sleeve, a locking member therefor, and means fixed to the track handling machine to actuate said locking member at a predetermined point so as to lock the sleeve and thrust boom.

GROVER J. HOLT.
WILFRED LONGEVIN.